United States Patent [19]

Lewis et al.

[11] Patent Number: 5,020,935
[45] Date of Patent: Jun. 4, 1991

[54] CONNECTOR

[75] Inventors: Peter J. Lewis, Sparkhill; Reginald Povey, Willenhall, both of United Kingdom

[73] Assignee: Burn Tubes Limited, So Lihull, United Kingdom

[21] Appl. No.: 342,343

[22] Filed: Apr. 24, 1989

[30] Foreign Application Priority Data

Apr. 29, 1988 [GB] United Kingdom ................ 8810283
Sep. 27, 1988 [GB] United Kingdom ................ 8822686

[51] Int. Cl.⁵ ............................................ F16B 7/04
[52] U.S. Cl. .................................... 403/391; 403/396; 403/400
[58] Field of Search ............... 403/396, 390, 391, 395, 403/400, 188, 389, 385, 394, 374, 409.1, 367, 97, 92, 171

[56] References Cited

U.S. PATENT DOCUMENTS

| | | | |
|---|---|---|---|
| 2,433,550 | 12/1947 | Graham | 403/385 |
| 3,065,981 | 11/1962 | Arrison | 403/385 |
| 3,107,932 | 10/1963 | Johnson et al. | 403/395 X |
| 3,325,227 | 6/1967 | Hunter | 403/395 |
| 3,591,211 | 7/1971 | Richey | 403/395 |
| 3,861,816 | 1/1976 | Zaidan | 403/400 X |
| 4,066,371 | 1/1978 | Chapman | 403/391 X |
| 4,114,977 | 9/1978 | Polidori | 403/390 X |
| 4,430,826 | 2/1984 | Ryaa | 403/97 X |
| 4,528,865 | 7/1985 | Nagano | 403/374 X |

FOREIGN PATENT DOCUMENTS 828863 2/1960 France ................ 403/395

Primary Examiner—Peter M. Cuomo
Attorney, Agent, or Firm—Parmelee, Miller, Welsh & Kratz

[57] ABSTRACT

A connector, to connect together two members, comprises a body having two sockets to receive the members. A wedge member is received in a pocket in the body which pocket opens to each socket so that parts of the wedge can extend into each socket to exert a clamping force on the members in their respective sockets.

16 Claims, 3 Drawing Sheets

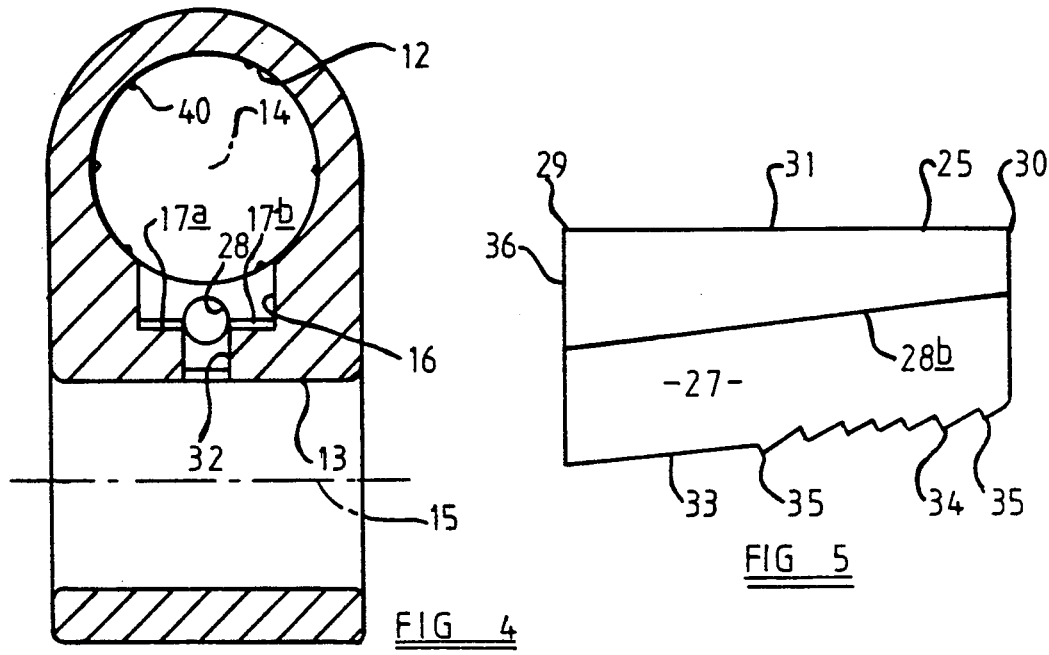
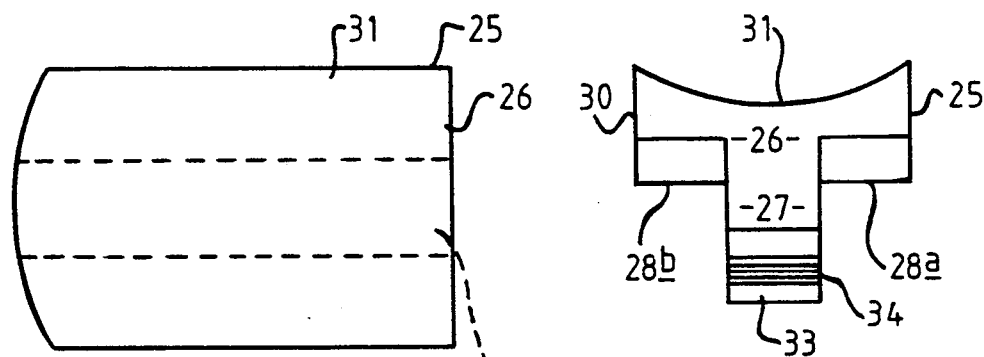
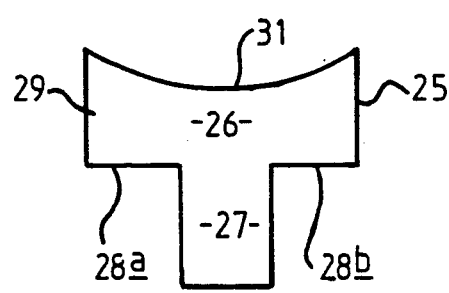

CONNECTOR

BACKGROUND OF THE INVENTION

This invention relates to a connector to connect together two members.

An object of the invention is to provide a new and improved connector to connect together two members.

SUMMARY OF THE INVENTION

According to one aspect of the invention we provide a connector, to connect together two members, comprising a body having a first socket to receive one of the members and a second socket to receive another of the members, a wedge member received in a pocket in the body which pocket opens to each socket so that in an operative position of the wedge member a first part of the wedge member can extend into the first socket for engagement with the one member when received therein and a second part of the wedge member can extend into the second socket for engagement with the other member when received therein to exert a clamping force on the members in their respective sockets.

The wedge member may be movable longitudinally of one of said sockets, to move said first part longitudinally and inwardly of said one socket and said second part transversely and inwardly of the other of said sockets.

The wedge member may be provided with teeth to engage a member and/or a part of the body to help maintain the wedge member in said operative position.

The sockets may be juxtaposed so that their longitudinal axes are mutually inclined at 90°.

One of said axes may be tangential to a circle which lies in a normal to the other axis and centred on said other axis.

The sockets may be cylindrical.

The pockets may be provided with a cam surface which extends generally longitudinally of one of the sockets but inclined relative to the longitudinal axis thereof, the wedge member having a co-operating abutment surface so that movement of the wedge member in a direction longitudinally of said one socket causes movement of a first clamping surface of the wedge member inwardly of the one socket, the wedge member having a second clamping surface which extends generally in the longitudinal direction of said one socket but inclined to said longitudinal axis of the one socket when disposed in the pocket so that movement in said longitudinal direction causes movement of the second clamping surface inwardly of the second socket.

The wedge member may be of generally T-shape in cross-section, said co-operating abutment surface being provided in two separate parts by the under surfaces of the head of the T.

Said teeth may be provided on the foot of the stem of the T.

The top surface of the head of the T may be of a shape corresponding to the shape of the adjacent part of the first socket, for example, of part cylindrical shape of a radius corresponding or substantially corresponding to the radius of the first socket.

The pocket may open to the exterior of the body at one longitudinal end of the pocket to permit of entry of the wedge member into the pocket.

The pocket may be provided with a passage which opens to the exterior of the body at the opposite longitudinal end of the pocket to permit of entry of a tool into the pocket to engage the wedge member to move the wedge member longitudinally out of said operative position.

Instead of providing the teeth on the foot of the stem of the T to engage a member engaged in the second socket said teeth may be provided on said abutment surface to engage the cam surface of the pocket.

According to another aspect of the invention, we provide an assembly comprising at least one connector according to the first aspect of the invention having first and second members received within the first and second socket respectively.

A similar further connector may be provided and have said first member received within the first socket of the further connector, the first sockets of each connector terminating in an end surface which lies in or adjacent to a diametral plane of the respective second socket and said end surfaces being disposed in face to face relationship and being relatively rotatable about a longitudinal axis of the first member.

The opposed end surfaces may be provided with inter-engageable formations such as radially extending ribs or teeth to restrain relative rotation therebetween.

BRIEF DESCRIPTION OF THE DRAWINGS

Two examples of the invention will now be described by way of example with reference to the accompanying drawings wherein, FIG. 4 is a section on the line 4—4 of FIG. 2, FIG. 5 is a side view of a wedge member of the connector of FIG. 1, FIG. 6 is a front view of the wedge member of FIG. 5, FIG. 7 is a rear view of the wedge member of FIG. 5, FIG. 8 is a plan view of the wedge member of FIG. 5.

DESCRIPTION OF THE PREFERRED EMBODIMENTS

Figure 1:
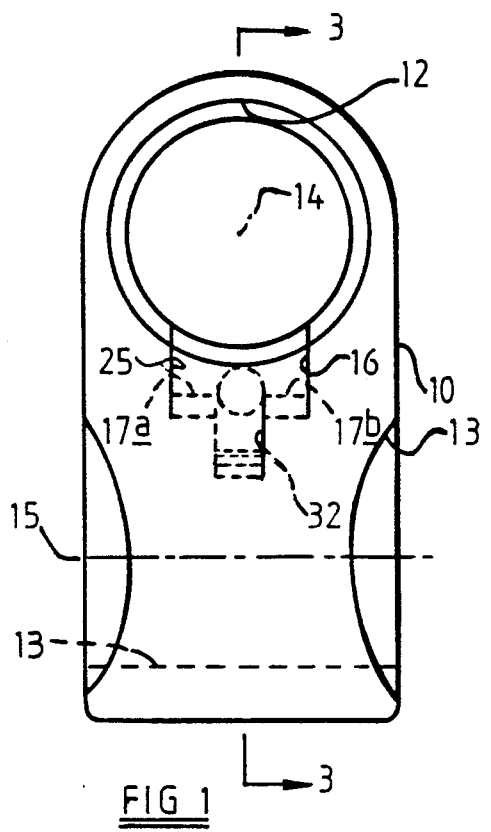
FIG. 1 is a front view of a connector embodying the invention.
Figure 2:
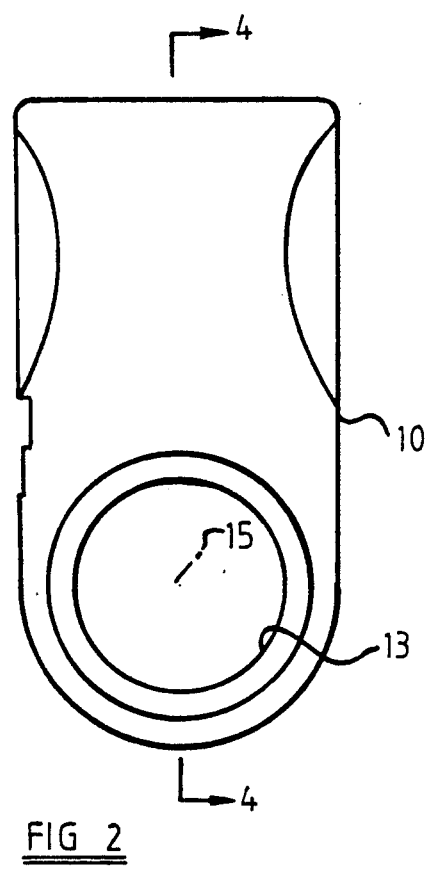
FIG. 2 is a side view of the connector of FIG. 1.

Referring to the drawings, a connector for connecting together the two tubes is indicated generally at 10. The connector 10 comprises a body 11 having a first cylindrical socket 12 and a second cylindrical socket 13 formed therein.

The first socket 12 has a central longitudinal axis 14 which is disposed tangential to a conceptual circle which is normal to and centered on the central longitudinal axis 15 of the second socket 13. Thus, the sockets 12 and 13 are mutally inclined at 90°.

Also provided in the body 10 is a pocket 16 which extends generally in the longitudinal direction of the first socket 12 and is provided with a cam surface comprising a pair of spaced parts 17a, 17b which extend generally longitudinally of the axis 14 of the first socket 12 but inclined thereto so that in a direction inwardly of the pocket 16 from an end 18 thereof which opens to the exterior 19 of the body 10 the surfaces 17a, 17b become closer to the axis 14.

At the longitudinally opposite end 20 of the pocket 16 to the end 18 is provided a passage 21 which communicates with the exterior 19 of the body 10 for a purpose hereinafter to be described.

Figure 3:
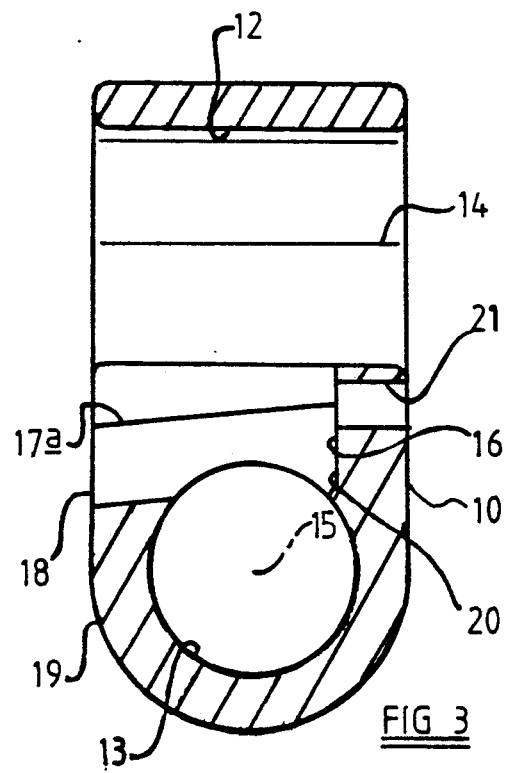
FIG. 3 is a section on the line 3—3 of FIG. 1.

Received within the pocket 16 is a wedge member 25 which is shown in FIGS. 5 to 8 and in FIG. 1 but which is omitted from FIGS. 3 and 4 for clarity. The wedge member 25 is of generally T-shape in cross-section, as best shown in FIGS. 6 and 7 comprising a head 26 and a stem 27. The under surfaces 28a, 28b of the head comprise abutment surfaces which co-operate with the cam surfaces 17a, 17b respectively. The surfaces 28a, 28b extend longitudinally of the wedge member from its outer end 29 to its inner end 30 and are closer to the top surface 31 of the T at the inner end 30 than at the outer end 29.

The top surface 31 is of part cylindrical configuration having a radius corresponding to the radius of the socket 12. The stem 27 of the T is received in a correspondingly shaped portion 32 of the pocket 16 and its under surface 33 is provided with teeth 34 of a symmetrical configuration as shown in FIG. 5 and it will be noted that the two end teeth 35 are of greater height than the remainder of the teeth, the tips of the remainder of the teeth lying within a continuation of the plane part of the surface 33. If desired a strengthening web may be provided extending centrally of the teeth 34 between the two end teeth and of a height slightly less than the height of the teeth 34.

The surfaces 28a, 28b and the surface 33 are inclined to the outer end surface 36 at the end 29 of the wedge member at an angle of 84°. The teeth have their flanks inclined at 90° with one flank inclined at 60° and the other flank inclined at 30° to the continuation of the planar part of the surface 33. If desired other angles may be provided.

In use, a pair of tubes, which in the present example are steel tubes with a 1 mm plastic coating thereon, for example, of nylon or PVC are connected together by virtue of being engaged one within each socket 12, 13. When the tubes are in their desired position relative to the body 10 the wedge member 25 is engaged in the pocket 16 and moved longitudinally inwardly thereof so that the surfaces 28a, 28b slide along the cam surfaces 17a, 17b of the pocket 16 thereby causing the surface 31 to move in a direction inwardly of the recess 12 so as to engage the surface of the tube therein and to clamp it against the oppositely disposed part of the surface of the socket 12.

At the same time the inclination of the under surface 33 of the stem 27 causes it to project into the socket 13 with which the part 32 of the pocket communicates and so the tubes in the socket 13 is similarly forced against the oppositely disposed part of the wall of the socket 13.

The teeth 34, 35 dig into the plastics coating of the tube and help to retain the wedge member 25 in its operative position in which it maintains the tubes in wedged engagement within their associated sockets.

If desired, in a modification, teeth may be provided on the surfaces 28a and/or 28b as well as or instead of the teeth on the under surface 33 and co-operating teeth may be provided on the surfaces 17a and/or 17b of the socket 16 to help maintain the wedge member 25 in its operative position. An upstanding rib or ribs may be provided extending longitudinal of the top surface 31 to help maintain the tube in the socket and resist rotation thereof.

In the present example, the body 10 is made of a moulding in ABS or nylon. The socket 12 is of 20 mm diameter whilst the socket 13 is of 18.1 mm diameter and are intended to accommodate tubes of 19.8 mm and 17.9 mm outside diameter respectively.

Each socket is preferably provided with 6 longitudinally extending ribs 40 0.2 mm high so it be seen that the ribs provide an interference fit with the plastics coated tubes of their associated sockets of the order of 0.2 mm. The ribs 40 are provided to resist relative rotation between the connector and the tubes.

If desired the connector may be used with other tubes including metal tubes which are uncoated with plastics material and in this case it is preferred to provide the teeth between the surfaces 17a, 17b and 28a, 28b and in this case the ribs 40 may be omitted and the sockets appropriately dimensioned to provide a close sliding fit with the tubes. Alternatively, the tubes may be made of other materials such as wood, light alloy, or synthetic plastics material. If desired one tube may be made of a different material to that of which the other tube is made. The wedge member may be made as a moulding in ABS or nylon or in any other suitable material.

If desired the wedge member and/or the body may be made of other material and at least the body could be made of metal.

If desired the sockets may be made of other shape and cylindrical for example they may be oval or of polygonal cross-section, such as square, hexagonal or octagonal and the wedge member 31 may have the top surface of the T formed to appropriate shape to engage with the configuration of tube engaged with the socket 12 as may the under surface 33 of the T.

Although in the above example the surfaces 28a, 28b are inclined at 84° to the vertical surface 36 and the cam surface 17a, 17b at a corresponding angle of 6° to the longitudinal axis of the socket 12 the co-operating surfaces may be inclined at other appropriate angles.

If desired the connector may be provided with further sockets and associated wedge members for example, there may be a further socket disposed on the opposite side of the socket 13 to the socket 12 and similarly orientated.

If desired however, the connector may be of other configuration and may, for example, connect together tubes which are juxtaposed at other than right angles.

Figure 9:
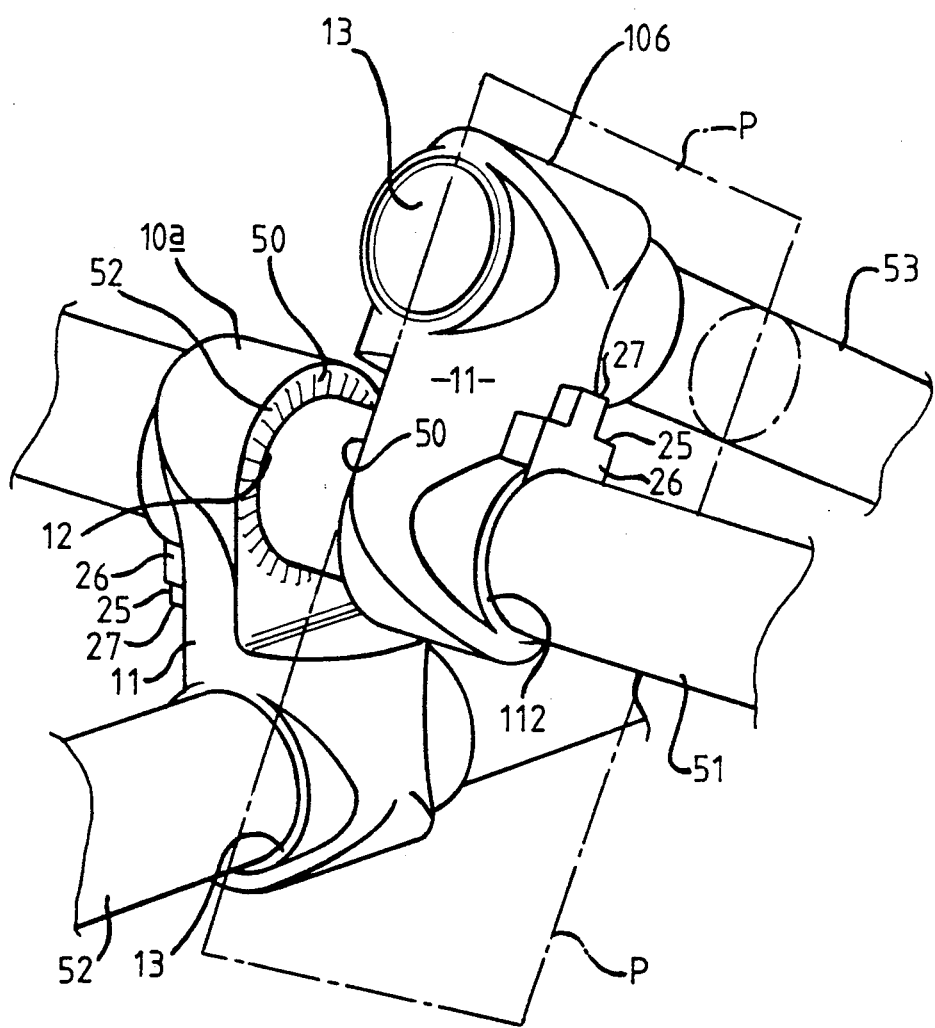
FIG. 9 is a perspective view of another embodiment of the invention.

Referring now to FIG. 9, there is shown another embodiment of the invention in which two connectors 10a, 10b each substantially as described with reference to FIGS. 1 to 8 are provided, but with the part of each body 11 which provides the first cylindrical sockets 12 having a cut-out therein so that approximately half of this portion of the body is omitted so that the sockets 12 shown in FIG. 9 are each of approximately half the length of the socket 12 shown in FIGS. 1 to 8.

The cut-outs provide a planar end surface 50 which lies in a respective diametral plane P of the respective second socket 13. If desired, the end surface 50 may be spaced from, but adjacent to, the respective plane P and the sockets 12 may be of the same, or different but complementary, length. The opposed end surfaces 50 are provided with radially disposed ribs or teeth 52 which inter-engage to restrain relative pivotal movement therebetween about the longitudinal axis of a tube 51.

If desired, the teeth 52 may be omitted and/or the surfaces 50 may be other than planar, for example, frusto-conical or part spherical, one providing a recess and the other a projection, received in the socket.

As a result, the two connectors 10a, 10b can be assembled on a single tube, or other member of cylindrical external configuration, 51 with the adjacent planar end surfaces 50 in face to face relationship so that the angle of the connectors about the longitudinal axis of the tube 51 may be adjusted so that the axes of the respective second cylindrical sockets 13 and hence tubes or other ribs 53, 54 received therein may be inclined in any desired angle between a perpendicular position, a parallel position, and a perpendicular position but extending in the opposite direction.

In all other respects the connectors 10a, 10b shown in FIG. 9 are as described with reference to FIGS. 1 to 8, except that the head part 26 of each wedge member 25 is correspondingly reduced in length so as not to project beyond the associated end surface 50, whilst the stem 27 is of the same length as in the previously described embodiment.

The features disclosed in the foregoing description, or the accompanying drawing, expressed in their specific forms or in terms of a means for performing the disclosed function, or a metal or process for attaining the disclosed result, or a class or group of substances or compositions, as appropriate, may, separately or any combination of such features, be utilised for realising the invention in diverse forms thereof.

We claim:

1. A connector comprising a body and a wedge member connecting together two mutually inclined members, the body presenting,
   a first socket having a longitudinal axis, one of said members being received in the first socket,
   a second socket having a longitudinal axis inclined to said longitudinal axis of said first socket, another of said members being received in the second socket,
   a pocket which opens to each of the sockets and has a longitudinal axis parallel to said longitudinal axis of the first socket and transverse to said longitudinal axis of the second socket,
   the wedge member being received in the pocket and being movable therein in a direction parallel to said longitudinal axis of the pocket, the wedge member presenting,
   a first part which extends into the first socket and presents a first clamping surface which extends parallel to said longitudinal axis of the first socket and engages said one member over a region of said one member which extends parallel to said longitudinal axis of the first socket, and
   a second part which extends onto the second socket and presents a second clamping surface which extends parallel to said longitudinal axis of the second socket and engages said second member over a region of said second member which extends parallel to said longitudinal axis of the second socket.

2. A connector according to claim 1 wherein the first clamping surface is shaped to conform to the shape of said one member so that said first clamping surface engages said one member over an area thereof which extends parallel and transversely to said longitudinal axis of the first socket.

3. A connector according to claim 1 wherein the wedge member is provided with teeth to engage at least one of a member and a part of the body to help maintain the wedge member in said operative position.

4. A connector according to claim 1 wherein the sockets are juxtaposed so that their longitudinal axes are mutually inclined at 90°.

5. A connector according to claim 4 wherein one of said axes is tangential to a circle which lies in a plane normal to the other axis and centred on said other axis.

6. A connector according to claim 1 wherein the sockets are cylindrical.

7. A connector according to claim 1 wherein the pocket opens to the exterior of the body at one longitudinal end of the pocket to permit of entry of the wedge member into the pocket.

8. A connector according to claim 1 in combination with a similar further connector and said first member is received within the first socket of the further connector, the first sockets of each connector terminating in an end surface which lies in or adjacent to a diametral plane of the respective second socket and said end surfaces being disposed in face to face relationship and being relatively rotatable about a longitudinal axis of the first member.

9. A connector according to claim 8 wherein the opposed end surfaces are provided with inter-engageable formations.

10. A connector according to claim 9 wherein said formations comprise radially extending ribs or teeth to restrain relative rotation therebetween.

11. A connector comprising a body and a wedge member connecting together two mutually inclined members, the body presenting,
    a first socket having a longitudinal axis, one of said members being received in the first socket,
    a second socket having a longitudinal axis inclined to said longitudinal axis of said first socket, another of said members being received in the second socket,
    a pocket which opens to each of the sockets and has a longitudinal axis parallel to said longitudinal axis of the first socket and transverse to said longitudinal axis of the second socket;
    the wedge member being received in the pocket and being movable therein in a direction parallel to said longitudinal axis of the pocket; the wedge member presenting;
    a first part which extends into the first socket and presents a first clamping surface which extends in the direction of said longitudinal axis of the first socket and engages said one member over a region of said one member which extends parallel to said longitudinal axis of the first socket,
    a second part which extends onto the second socket and presents a second clamping surface which extends in the direction of said longitudinal axis of the second socket and engages said second member over a region of said second member which extends parallel to said longitudinal axis of the second socket; and
    wherein the pocket is provided with a cam surface which extends generally longitudinally of the first socket but inclined relative to the longitudinal axis thereof, the wedge member having a co-operating abutment surface so that movement of the wedge member in a direction longitudinally of the first socket causes movement of the wedge member and the first clamping surface thereof inwardly of the first socket, and the second clamping surface extends generally in the longitudinal direction of the first socket but inclined to said longitudinal axis of said first socket so that movement of the wedge member in said direction longitudinally of the pocket causes movement of the second clamping surface transversely and inwardly of the second socket.

12. A connector according to claim 11 wherein the wedge member is of generally T-shape in cross-section, said co-operating abutment surface being provided in two separate parts by the under surfaces of the head of the T.

13. A connector according to claim 12 wherein the wedge member is provided with teeth to engage at least one of a member and a part of the body to help maintain the wedge member in said operative position and said teeth are provided on the foot of the stem of the T.

14. A connector according to claim 12 wherein the top surface of the head of the T is of a shape corresponding to the shape of the adjacent part of the first socket.

15. A connector according to claim 14 wherein the pocket is provided with a passage which opens to the exterior of the body at the opposite longitudinal end of the pocket to permit of entry of a tool into the pocket to engage the wedge member to move the wedge member longitudinally out of said operative position.

16. A connector according to claim 11 wherein the wedge member is provided with teeth to engage at least one of a member and a part of the body to help maintain the wedge member in said operative position and said teeth are provided on said abutment surface to engage the cam surface of the pocket.

* * * * *